(12) United States Patent
Wallrafen

(10) Patent No.: US 6,181,127 B1
(45) Date of Patent: Jan. 30, 2001

(54) METHOD AND CIRCUIT FOR CHECKING THE WIDTH OF THE AIR GAP IN A SPEED SENSOR

(75) Inventor: Werner Wallrafen, Hofheim (DE)

(73) Assignee: Mannesmann VDO AG (DE)

(*) Notice: Under 35 U.S.C. 154(b), the term of this patent shall be extended for 0 days.

(21) Appl. No.: 09/304,390

(22) Filed: May 4, 1999

(30) Foreign Application Priority Data

May 4, 1998 (DE) .............................................. 198 19 783

(51) Int. Cl.[7] ................................. G01P 3/48; G01B 7/14
(52) U.S. Cl. .......................... 324/166; 324/163; 324/165; 324/174; 324/207.25; 324/207.26
(58) Field of Search ..................................... 324/160, 163, 324/165, 173, 174, 202, 207.12, 207.2, 207.21, 207.25, 207.26; 340/670, 671; 361/239

(56) References Cited

U.S. PATENT DOCUMENTS

| 4,902,970 | 2/1990 | Suquet | 324/173 |
| 6,008,638 | * 12/1999 | Bleckmann et al. | 324/166 |

FOREIGN PATENT DOCUMENTS

| 2459749 | 7/1976 | (DE) . |
| 3226073A1 | 4/1983 | (DE) . |
| 3201811A1 | 9/1983 | (DE) . |
| 4216142A1 | 11/1993 | (DE) . |
| 4308031A1 | 4/1994 | (DE) . |
| 196 23 101A1 | 10/1997 | (DE) . |
| 196 18 867A | 12/1997 | (DE) . |
| 196 34 715A1 | 3/1998 | (DE) . |
| 0282732A2 | 9/1988 | (EP) . |
| 0569924A | 11/1993 | (EP) . |
| 9610751 | 4/1996 | (WO) . |

* cited by examiner

Primary Examiner—Jay Patidar
(74) Attorney, Agent, or Firm—Mayer Brown & Platt

(57) ABSTRACT

In the case of a method for checking the width of the measuring air gap of a magnetic speed sensor, square-wave output signals are generated from the measurement signals of the sensor by means of at least one prescribable threshold value. The pulse duty factor of the output signals is held within a prescribed range in the case of an acceptable gap width. In the case of amplitudes of the measurement signal outside prescribed limits, the pulse duty factor deviates in a reliably measurable fashion from the prescribed range. A circuit has the means for carrying out this method.

12 Claims, 2 Drawing Sheets

METHOD AND CIRCUIT FOR CHECKING THE WIDTH OF THE AIR GAP IN A SPEED SENSOR

BACKGROUND OF THE INVENTION

1. Field of the Invention

The invention relates to a method and a circuit for checking the width of the air gap between a coded rotor, which varies a magnetic flux, and at least one sensor element which is sensitive to magnetic fields and is provided for recording the rotary movement of the rotor, and to which a circuit is connected and in which measurement signals are generated by the magnetic variation during rotation of the rotor, the measurement signals being converted by the circuit into output signals which can be evaluated by a connected control device.

2. Description of the Related Art

Magnetically based speed sensors are used, for example, in motor vehicles in connection with antilock systems. A circuit for such a sensor is known, for example, from WO 96/10751. The circuit changes the shape or the strength of the output signal as a function of the air gap width. The output signal is evaluated by the connected control device. However, the expenditure for the evaluation is very high in the case of such a mode of procedure, since the output signal is not present in discrete form. Moreover, the direct modulation of information on direction of rotation is an unreliable method, since interference has a strong influence.

It is the object of the present invention to specify a method and a simple, cost-effective circuit for a magnetic speed sensor for generating a discrete speed signal which contains information for the width of the air gap, two lines sufficing to relay this signal to other devices via a cable connection.

This object is achieved by means of the method according to the invention by virtue of the fact that square-wave output signals are generated from the measurement signals by means of at least one prescribable threshold value, wherein the pulse duty factor of the square-wave output signals is kept within a prescribed range in the case of an air gap width lying within a tolerance band, and wherein the pulse duty factor deviates in a reliably measurable fashion from the prescribed range in the case of amplitudes of the measurement signal outside prescribed limits.

SUMMARY OF THE INVENTION

The purposes and advantages of the invention will be set forth in and apparent from the descriptions and drawings that follow below, as well as will be learned from the practice of the invention. Additional advantages of the invention will be realized and obtained from the elements of the apparatus particularly pointed out in the appended claims.

To achieve these and other advantages and in accordance with the purpose of the invention, as embodied and described herein, a method and circuit for checking the width of an air gap is provided. In a first refinement of the method according to the invention, it is provided that the pulse duty factor lies at 50% within a tolerance band of ±15% in the case of an air gap width lying within a tolerance band, and wherein the pulse duty factor deviates at least by 10% from the respective limits of the tolerance band in the case of amplitudes of the measurement signal outside the prescribed limits. A pulse duty factor of 50% yields a high reliability against interference.

The circuit according to the invention, which is provided for implementing the method according to the invention, comprises

- a comparator circuit which generates the square-wave signals from the measurement signals by means of at least one prescribable threshold value,
- a detector circuit which determines the threshold value from the amplitude of the measurement signals in such a way that the pulse duty factor of the output signals lies within a prescribed range, the detector circuit prescribing the threshold value for the comparator circuit and
- an amplitude discriminator which in the case of amplitudes of the measurement signal outside prescribed limits generates signals for changing the threshold value in such a way that the pulse duty factor deviates in a reliably measurable fashion from the prescribed range.

In a first refinement of the circuit according to the invention, there is provided as output stage a current source to which a voltage is applied by the control device via a first line, and which feeds a current forming the output signals to the control device via a second line. As a result, it is possible without a large outlay on circuitry for the circuit to receive an approximately constant operating voltage via the same lines via which the output signals in the form of current pulses are also transmitted to the control device. There is thus no need for any additional lines for transmitting the signals.

The signal for the direction of rotation can be transmitted without additional outlay on cables if, as is provided in a first development of the invention, the current source can be set to different level values of the output current as a function of the direction of rotation of the rotor. The information on the direction of rotation can thereby be transmitted via the same lines as all other information.

In a next development of the invention, it is provided that the sensor has two sensor elements which are sensitive to magnetic fields and are arranged in such a way that their measurement signals are phase-offset. A signal for the direction of rotation is yielded from the logic combination of the resulting square-wave signals by means of an exclusive- or function.

In order to be able to control the current source with the signal for the direction of rotation, in a next development of the invention means are provided for generating a signal for the direction of rotation for the purpose of representing the direction of rotation of the rotor. Furthermore, it is provided that the detector circuit transmits to the current source the signal for the direction of rotation, and wherein the current source changes the amplitude of the output current as a function of the signal for the direction of rotation.

The output signals contain the information on the direction of rotation. Consequently, in a next advantageous development of the invention it is provided that the control device determines the direction of rotation of the rotor with the aid of the amplitude of the output current of the circuit.

In the case of two further, alternative developments of the invention it is provided that the change in the threshold value is performed continuously or discontinuously by the amplitude discriminator in the case of amplitudes of the measurement signal outside prescribed limits. The person skilled in the art can decide in the individual case whether he prefers the discontinuous change for the benefit of a sharper delimitation of the pulse duty factor, or whether he prefers the continuous change for the benefit of enabling intermediate values to be represented.

It is preferably provided that the rotor is a magnet wheel.

It is to be understood that both the foregoing general description and the following detailed description are exemplary and are provided for purposes of explanation only, and are not restrictive of the invention as claimed.

BRIEF DESCRIPTION OF THE DRAWINGS

The accompanying drawings, which are incorporated in and constitute part of this specification, illustrate the preferred embodiment of the invention, and together with the description serve to explain the principles of the invention.

DETAILED DESCRIPTION OF THE PREFERRED EMBODIMENT

Figure 1:
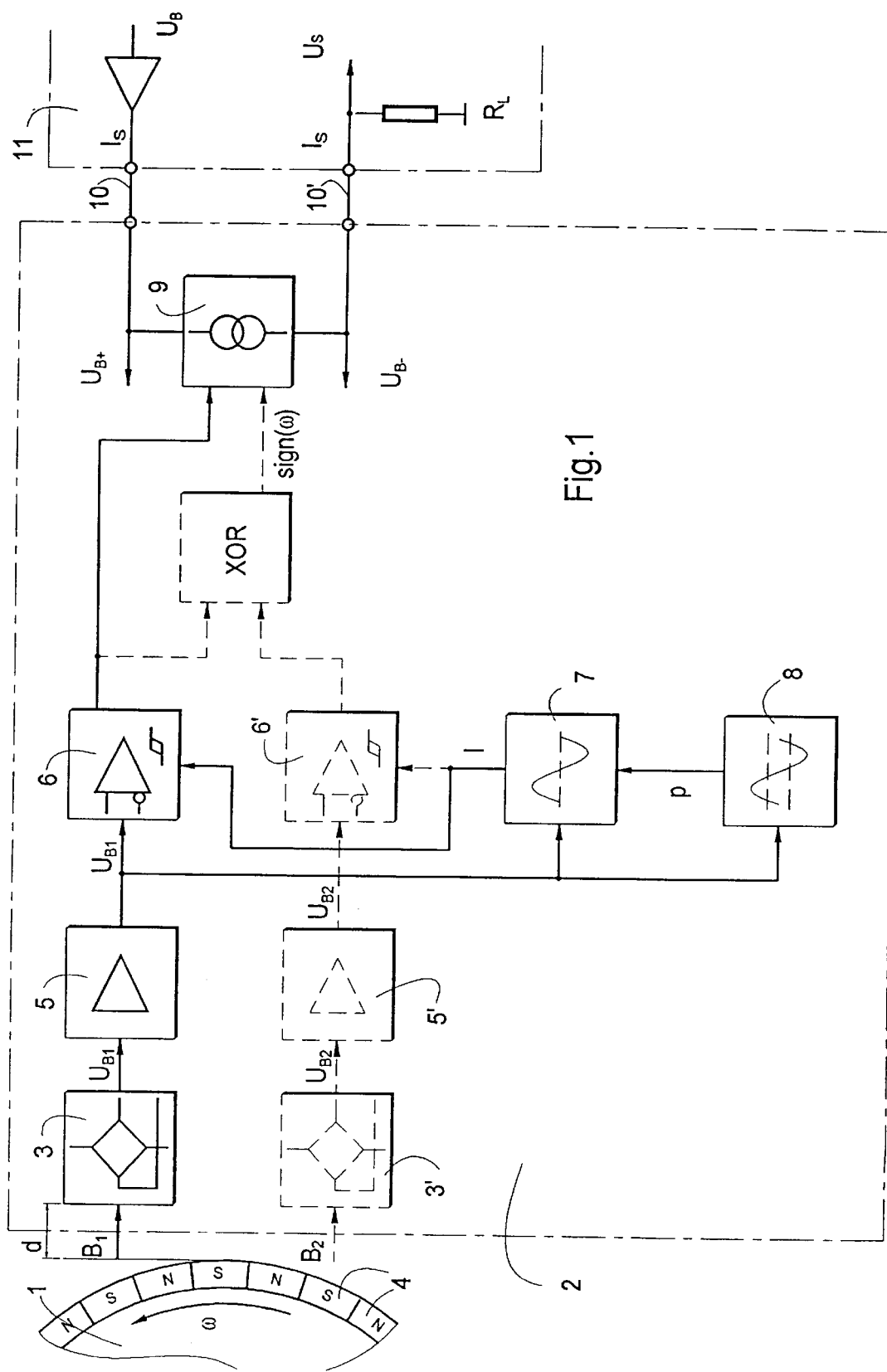
FIG. 1 shows a first circuit according to the invention.

In the vicinity of the rotor 1, which is connected, for example, to a wheel of a motor vehicle and is preferably designed as a magnet wheel, a speed sensor 2 according to the invention is arranged in such a way that the sensor elements 3, 3' are situated opposite the magnet poles 4 of the magnet wheel 1 at a slight spacing denoted by air gap width d. The magnet wheel 1 the magnet poles 4 of the magnet wheel 1 at a slight spacing denoted by air gap width d. The magnet wheel 1 rotates with an angular velocity omega. The changes in the magnetic fluxes $B_1$, $B_2$, which result from the movement of the magnet wheel 1, are converted by the sensor elements 3, 3' into measurement signals $U_{B1}$, $U_{B2}$ depend on the air gap width d. The larger the air gap, the smaller the magnetic flux, and the smaller the amplitude of the measurement signal. The measurement signals $U_{B1}$, $U_{B2}$ are fed to amplifiers 5, 5'. A first amplified measurement signal $U_{B1}$ is fed to a comparator circuit 6, a detector circuit 7 and an amplitude discriminator 8. The amplitude discriminator 8 generates a signal p if the amplitude of the first measurement signal $U_{B1}$, is outside a prescribed range. The signal p is fed to the detector circuit 7 and causes there a change in the threshold value L which is determined by the detector circuit 7 from the measurement signal $U_{B1}$. The threshold value L is fed to the comparator circuit 6, which compares the measurement signal $U_{B1}$ with the threshold value L and generates a square-wave signal. The frequency of this square-wave signal contains the speed n of the magnet wheel 1 as information.

The change in the threshold value owing to the signal p from the amplitude discriminator 8 causes a change in the pulse duty factor at the output of the comparator circuit 6. In this way, an impermissibly small or large air gap width d may be indicated by a greatly changed pulse duty factor. The pulse duty factor therefore serves as information as to whether the air gap width d deviates upward or downward from a prescribed tolerance band.

The output signals $U_S$ of the comparator circuit 6 are converted by a controllable current source 9 into current signals $I_S$. The current source 9 supplies itself with current via a first connecting lead 10, which is connected to a control device 11. Voltage signals $U_S$ corresponding to the current signals $I_S$ are tapped in the control device 11 via a load resistance $R_L$ from a second connecting lead 10'. The leads simultaneously form the two poles of the operating voltage supply of the sensor 2, of which $U_{B+}$ $U_{B-}$ are fed to the individual circuits 3, 5, 6, 7 and 8 after filtering and stabilization.

The parts of the circuit which are represented by dashes in FIG. 1 are provided optionally for the case in which the direction of rotation is also to be determined in addition to the speed. The two sensor elements 3, 3' are arranged such that the outgoing measurement signals $B_1$, $B_2$ are phase-shifted by approximately 90°. The measurement signals $B_1$, $B_2$ are converted into a signal sign ($\overline{\omega}$) for the direction of rotation in the detector circuit 7 in the known way, for example via an exclusive- or circuit (XOR) and a further comparator circuit 6'. The current source 9 is designed in such a way that it sets two different levels for $I_S$ as a function of the signal sign ($\overline{\omega}$). The control device 11 can thus detect the direction in which the magnet wheel 1 is rotating from the level $I_S$. This economizes on third cable connection between the sensor 2 and the control device 11.

Figure 2:
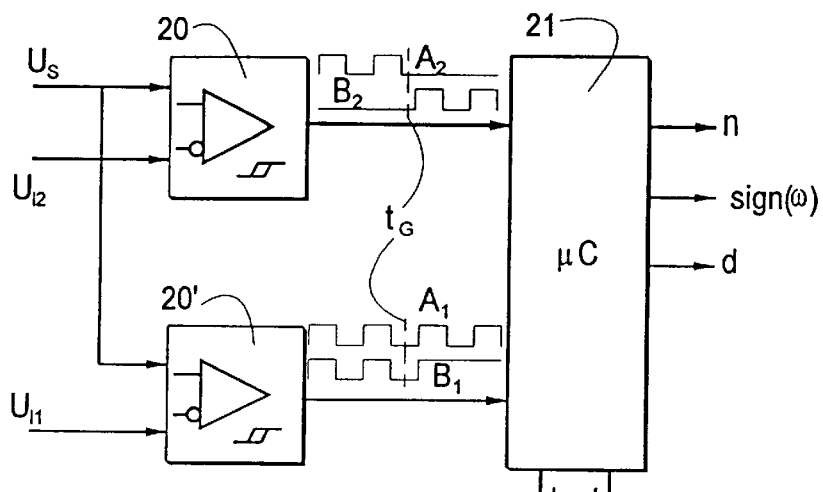
FIG. 2 shows a detail of a second circuit according to the invention.

Represented in FIG. 2 is an evaluation circuit such as can be provided, for example, in the control device 11. It comprises two comparator circuits 20, 20', which compare the coded output signal $U_S$ with two different reference voltages $U_{11}$ and $U_{12}$. The output signals are fed to a microcomputer 21 which determines therefrom the speed n, direction sign ($\overline{\omega}$) of rotation, and the air gap width diagnosis d from the pulse duty factor.

Figure 3:
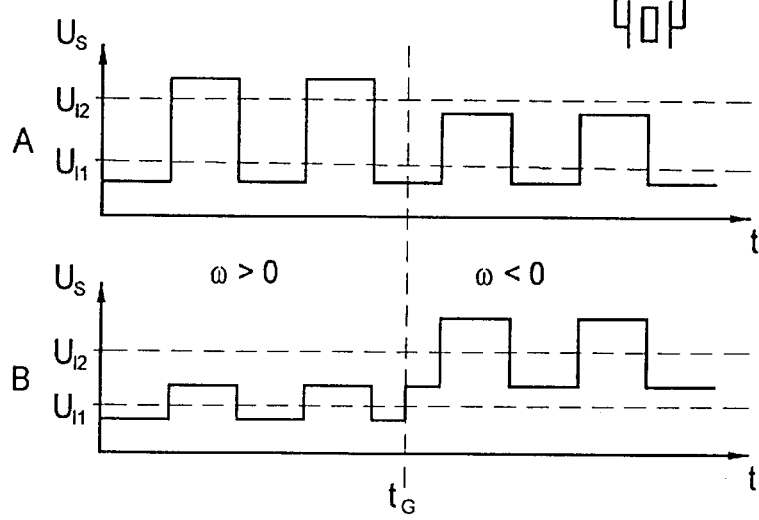
FIG. 3 shows the measuring voltage profile of two circuits according to the invention in the case of a change in the direction of rotation.

The signal profiles represented on the cable connections between the comparator circuits 20, 20' and the microcomputer 21 relate to the examples in FIG. 3. At the instant $t_G$, the previously positive direction of rotation becomes negative. The reference voltage $U_{11}$ is set precisely so that it is smaller than the smaller of the two signal amplitudes. $U_{12}$ lies between the larger and the smaller signal amplitudes.

In the Example A, the reference voltage $U_{12}$, is never overshot in the case of a negative direction of rotation; the signal A2 remains constant starting from the instant $t_G$ at a low level. By contrast, the signal A1 runs, in the case of either direction of rotation, in the shape of a square wave, because the reference voltage $U_{11}$ is overshot in the case of either direction of rotation by the signal pulses. In Example B, the reference voltage $U_{12}$ is overshot by the signal pulses only in the case of a negative direction of rotation. The reference voltage $U_{11}$ is overshot in the case of a positive direction of rotation only during the signal pulses, and permanently in the case of a negative direction of rotation. As a consequence, the signal B2, exhibits a constant profile at a low level in the case of a positive direction of rotation. The signal B1 runs in a constant fashion at a high level in the case of a negative direction of rotation. In the other ranges, the signals are in the shape of a square wave. They have the same frequency there as the signal $U_S$. In the Example A, the direction of rotation is therefore negative when the signal A2 is constant. In Example B, the direction of rotation is negative when the signal B1 is constant. Otherwise, the direction of rotation is positive.

In this way, two signals $A_1$ and $A_2$ and, respectively, $B_1$ $B_2$ are produced respectively in the case of Examples A and B. The microcomputer detects from the two signals direction sign ($\overline{\omega}$) of rotation, the speed n and also the air gap diagnosis d, the case being that the pulse duty factor of the square-wave signals A1, A2, B1, B2 is the same as that of $U_S$.

FIG. 3 shows output signals $U_S$ for the two Examples A and B. In the case of a positive direction of rotation, in Example A the current source generates a larger amplitude of the current than in the case of a negative direction of rotation. In Example B, an additional direct component is added to the output signal $U_S$ in the case of a negative direction of rotation. The control device 11 uses the amplitude or the direct component of the output signal $U_S$ to detect the direction of rotation of the magnet wheel 1. Example A has the advantage that the output signal $U_S$ has a larger spacing between the signal voltage and interference voltages in the case of a positive direction of rotation.

Figure 4:
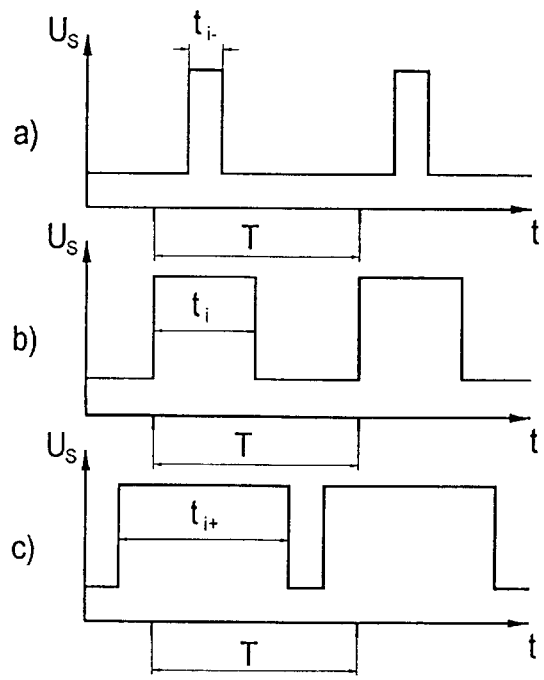
FIG. 4 shows the profiles of the output voltage of a circuit according to the invention in the case of different air gap widths.

The pulse duty factor $t_i/T$ set in normal operation is at approximately 50%. If the air gap width lies outside a prescribed standard range, the pulse duty factor is varied by the comparator circuit 6. The output signal $U_S$ is represented in FIG. 4 for various pulse duty factors. In FIG. 4*a*, the air gap is too small; the pulse duty factor is set at a correspondingly lower level. FIG. 4*b* shows the standard state, and FIG. 4*c* the state in the case of an excessively large air gap width.

Other embodiments of the invention will be apparent to those skilled in the art from consideration of the specification, claims and practice of the invention disclosed herein. It is intended that the specification and examples be considered exemplary.

What is claimed is:

1. A method for checking the width of the air gap between a coded rotor, which varies a magnetic flux, and at least one sensor element which is sensitive to magnetic fields and is provided for recording the rotary movement of the rotor, and to which a circuit is connected and in which measurement signals are generated by the magnetic variation during rotation of the rotor, the measurement signals being converted by the circuit into output signals which can be evaluated by a connected control device, wherein square-wave output signals ($I_S$) are generated from the measurement signals ($U_{B1}$, $U_{B2}$) by means of at least one prescribable threshold value (L), wherein the pulse duty factor ($t_i/T$) of the square-wave output signals ($I_S$) is kept within a prescribed range in the case of an air gap width (d) lying within a tolerance band, and wherein the pulse duty factor ($t_i/T$) deviates in a reliably measurable fashion from the prescribed range in the case of amplitudes of the measurement signal ($U_{B1}$, $U_{B2}$) outside prescribed limits.

2. The method as claimed in claim 1, wherein the pulse duty factor ($t_i/T$) lies at 50% within a tolerance band of ±15% in the case of an air gap width (d) lying within a tolerance band, and wherein the pulse duty factor ($t_i/T$) deviates by at least 10% from the respective limits of the tolerance band in the case of amplitudes of the measurement signal outside the prescribed limits.

3. A circuit for carrying out the method as claimed in 1, having a speed sensor with means for checking the air gap width (d) between a coded rotor, which varies a magnetic flux, and at least one sensor element which is sensitive to magnetic fields and is provided for recording the rotary movement of the rotor, and to which the circuit is connected and in which measurement signals are generated by the magnetic variation during rotation of the rotor, the measurement signals being converted by the circuit into square-wave signals which can be evaluated by a connected control device, defined by a comparator circuit (6) which generates the square-wave signals ($U_S$) from the measurement signals ($U_{B1}$, $U_{B2}$) by means of at least one prescribable threshold value (L), a detector circuit (7) which determines the threshold value (L) from the amplitude of the measurement signals ($U_{B1}$, $U_{B2}$) in such a way that the pulse duty factor ($t_i/T$) of the output signals ($I_S$) lies within a prescribed range, the detector circuit (7) prescribing the threshold value (L) for the comparator circuit (6) and an amplitude discriminator (8) which in the case of amplitudes of the measurement signal ($U_{B1}$, $U_{B2}$) outside prescribed limits generates signals (p) for changing the threshold value (L) in such a way that the pulse duty factor ($t_i/T$) deviates in a reliably measurable fashion from the prescribed range.

4. The circuit as claimed in claim 3, wherein there is provided as output stage a current source (9) to which a voltage ($U_S$) is applied by the control device (11) via a first line (10), and which feeds a current ($I_S$) forming the output signals to the control device (11) via a second line (10').

5. The circuit as claimed in claim 4, wherein the current source (9) can be set to different level values of the output current ($I_S$) as a function of the direction of rotation (sign ($\overline{\omega}$)) of the rotor (1).

6. The circuit as claimed in claim 3, wherein the sensor (2) has two sensor elements (3, 3') which are sensitive to magnetic fields and are arranged in such a way that their measurement signals ($U_{B1}$, $U_{B2}$) are phase-offset.

7. The circuit as claimed in claim 3, defined by means (XOR) for generating a signal (sign ($\overline{\omega}$)) for the direction of rotation for the purpose of representing the direction of rotation of the rotor (1).

8. The circuit as claimed in claims 4, wherein the detector circuit (7) transmits to the current source (9) the signal (sign ($\overline{\omega}$)) for the direction of rotation, and wherein the current source (9) changes the amplitude of the output current ($I_S$) as a function of the signal (sign ($\overline{\omega}$)) for the direction of rotation.

9. The circuit as claimed in claim 8, wherein the control device (11) determines the direction of rotation (sign ($\overline{\omega}$)) of the rotor (1) with the aid of the amplitude of the output current ($I_S$) of the sensor (2).

10. The circuit as claimed in claim 3, wherein the change in the threshold value (L) is performed continuously by the amplitude discriminator (8) in the case of amplitudes of the measurement signal ($U_{B1}$, $U_{B2}$) outside prescribed limits.

11. The circuit as claimed in claim 3, wherein the change in the threshold value (L) is performed discontinuously by the amplitude discriminator (8) in the case of amplitudes of the measurement signal ($U_{B1}$, $U_{B2}$) outside prescribed limits.

12. The circuit as claimed in claim 3, wherein the rotor is a magnet wheel.

* * * * *